(12) United States Patent
Schatz et al.

(10) Patent No.: US 12,070,807 B2
(45) Date of Patent: Aug. 27, 2024

(54) ONE-PIECE CUTTING HEAD FOR A DRILL BIT

(71) Applicant: BLACK & DECKER INC., New Britain, CT (US)

(72) Inventors: Juri Schatz, Limburg (DE); Alexander Stangl, Furstenzell (DE); Florian Probst, Aidenbach (DE); Christoph Gastinger, Hutthurm (DE)

(73) Assignee: BLACK & DECKER INC., New Britain, CT (US)

( * ) Notice: Subject to any disclaimer, the term of this patent is extended or adjusted under 35 U.S.C. 154(b) by 230 days.

(21) Appl. No.: 17/692,428

(22) Filed: Mar. 11, 2022

(65) Prior Publication Data

US 2022/0297204 A1   Sep. 22, 2022

(30) Foreign Application Priority Data

Mar. 18, 2021 (EP) .................................... 21163504

(51) Int. Cl.
*E21B 10/42* (2006.01)
*B23B 51/02* (2006.01)
(Continued)

(52) U.S. Cl.
CPC .............. *B23B 51/02* (2013.01); *B28D 1/146* (2013.01); *E21B 10/42* (2013.01); *E21B 10/43* (2013.01);
(Continued)

(58) Field of Classification Search
CPC .......... E21B 10/42; E21B 10/43; E21B 10/54; B23B 51/02; B23B 2229/08
See application file for complete search history.

(56) References Cited

U.S. PATENT DOCUMENTS

| 7,001,120 B2 | 2/2006 | Moser et al. |
| 7,137,461 B2 | 11/2006 | Meierhofer |

(Continued)

FOREIGN PATENT DOCUMENTS

| CN | 202097441 U | 1/2012 |
| CN | 203236023 U | 10/2013 |

(Continued)

OTHER PUBLICATIONS

Extended European Search Report, issued in application No. 21163504.0, dated Sep. 9, 2021, 8 pages.

*Primary Examiner* — Cathleen R Hutchins
(74) *Attorney, Agent, or Firm* — Scott B. Markow

(57) ABSTRACT

A one-piece cutting head for a drill bit includes a main cutting edge that extends between radial extremities of the cutting head. The main cutting edge is disposed between main rake surfaces and main relief surfaces. Each main rake surface includes one or more rake facets, and each main relief surface includes one or more relief facets. Adjacent rake facets and relief facets define a primary transverse edge therebetween that extends away from the main cutting edge. The cutting head further includes a plurality of side cutters that are transverse to the main cutting edge and that propagate from the primary transverse edge to a radial extremity of the cutting head. Each side cutter includes a side cutting edge between a side cutting rake facet and a side cutting relief facet.

25 Claims, 17 Drawing Sheets

(51) Int. Cl.
  *B28D 1/14* (2006.01)
  *E21B 10/43* (2006.01)
  *E21B 10/54* (2006.01)

(52) U.S. Cl.
  CPC .......... *E21B 10/54* (2013.01); *B23B 2226/75* (2013.01); *B23B 2251/14* (2013.01); *B23B 2251/204* (2013.01)

(56) References Cited

U.S. PATENT DOCUMENTS

| | | |
|---|---|---|
| 7,314,102 B2 | 1/2008 | Magin |
| 7,549,491 B2 | 6/2009 | Hoeggerl et al. |
| 7,559,382 B2 | 7/2009 | Koch |
| 7,559,383 B2 | 7/2009 | Koch et al. |
| 10,047,564 B2 | 8/2018 | Jones et al. |
| 2001/0013430 A1* | 8/2001 | Hauptmann ............ B23B 51/02 175/420.1 |
| 2005/0274551 A1* | 12/2005 | Batliner ................. B23B 51/02 175/414 |
| 2008/0110679 A1* | 5/2008 | Koch .................... B28D 1/146 175/395 |
| 2009/0103990 A1 | 4/2009 | Koch |
| 2010/0135741 A1* | 6/2010 | Probst .................. E21B 10/58 408/230 |

FOREIGN PATENT DOCUMENTS

| | | |
|---|---|---|
| CN | 103381495 A | 11/2013 |
| CN | 203541646 U | 4/2014 |
| CN | 204018808 U | 12/2014 |
| CN | 205096600 U | 3/2016 |
| CN | 206763959 U | 12/2017 |
| CN | 107617767 A | 1/2018 |
| CN | 206981825 U | 2/2018 |
| CN | 106064249 B | 4/2018 |
| CN | 207171028 U | 4/2018 |
| CN | 207521769 U | 6/2018 |
| CN | 207615714 U | 7/2018 |
| CN | 110681890 A | 1/2020 |
| DE | 3325149 A1 | 1/1985 |
| DE | 102016101805 A1 | 8/2017 |
| EP | 0137898 A1 | 4/1985 |
| EP | 0778391 A2 | 6/1997 |
| EP | 1045112 A1 | 10/2000 |
| EP | 1188897 B1 | 6/2006 |
| EP | 1604762 B1 | 11/2007 |
| EP | 1867417 A1 | 12/2007 |
| EP | 1506830 B1 | 10/2008 |
| EP | 1125663 B1 | 6/2009 |
| EP | 1944107 B1 | 7/2009 |
| EP | 1923160 B1 | 3/2010 |
| EP | 1875032 B1 | 9/2010 |
| EP | 1935540 B1 | 2/2017 |
| WO | 2016109110 A1 | 7/2016 |

* cited by examiner

ONE-PIECE CUTTING HEAD FOR A DRILL BIT

CROSS REFERENCE TO RELATED APPLICATION

This application claims priority under 35 U.S.C. § 119 to European Patent Application No. 21163504.0, filed Mar. 18, 2021, which is incorporated by reference.

FIELD

This application relates to drill bits, especially to drill bits for hammer drilling into masonry, concrete, brick, stone, rock, and the like (generally referred to as "masonry" drill bits). This application also relates to a cutting head for such a drill bit.

SUMMARY

This application seeks to provide improved drill bits and improved cutting heads for drill bits.

In a first aspect, a one-piece cutting head for a drill bit includes a main cutting edge extending substantially between radial extremities of the cutting head. The main cutting edge is an edge between main rake surfaces and main relief surfaces of the cutting head. Each main rake surface includes one or more rake facets, and each main relief surface includes one or more relief facets (22, 24). Adjacent rake and relief facets define a primary transverse edge therebetween. The primary transverse edge extends away from the main cutting edge. The cutting head is characterized in that it further includes a plurality of side cutters propagating from the center at the primary transverse edge. Each side cutter includes a side cutting edge extending substantially between radial extremes of the cutting head and substantially perpendicular to the main cutting edge. Each side cutting edge is an edge between a side cutting rake facet and a side cutting relief facet.

In another aspect, a one-piece cutting head for a drill bit includes the features of the first aspect and is further characterized in that the main relief surfaces further include a pocket.

In yet another aspect, a one-piece cutting head for a drill bit includes the features of the first aspect and is further characterized in that the cutting head further includes a plurality of friction reducing cutting edges positioned adjacent the main rake surface and substantially orthogonal thereto.

In yet another aspect, a one-piece cutting head for a drill bit includes the features of the first aspect and is characterized in that the cutting head further includes a combination of any of the features of any of the foregoing aspects.

In a further aspect, a drill bit includes a one-piece cutting head according to any aforementioned aspects.

BRIEF DESCRIPTION OF THE DRAWINGS

Embodiments of a drill bit and cutting head will now be described, by way of example, with reference to the accompanying drawings, of which.

DETAILED DESCRIPTION OF THE DRAWINGS

Figure 1:
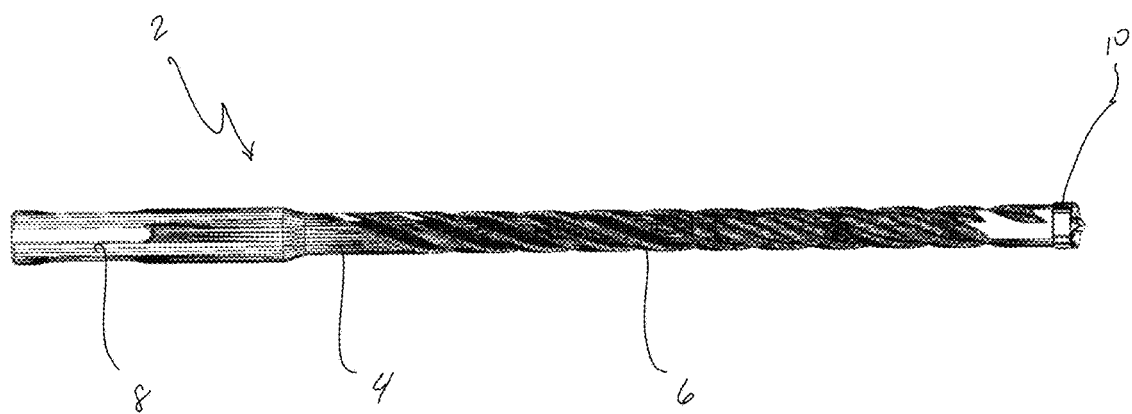
FIG. 1 is a perspective view of a drill bit in accordance with the present invention.
Figure 2:
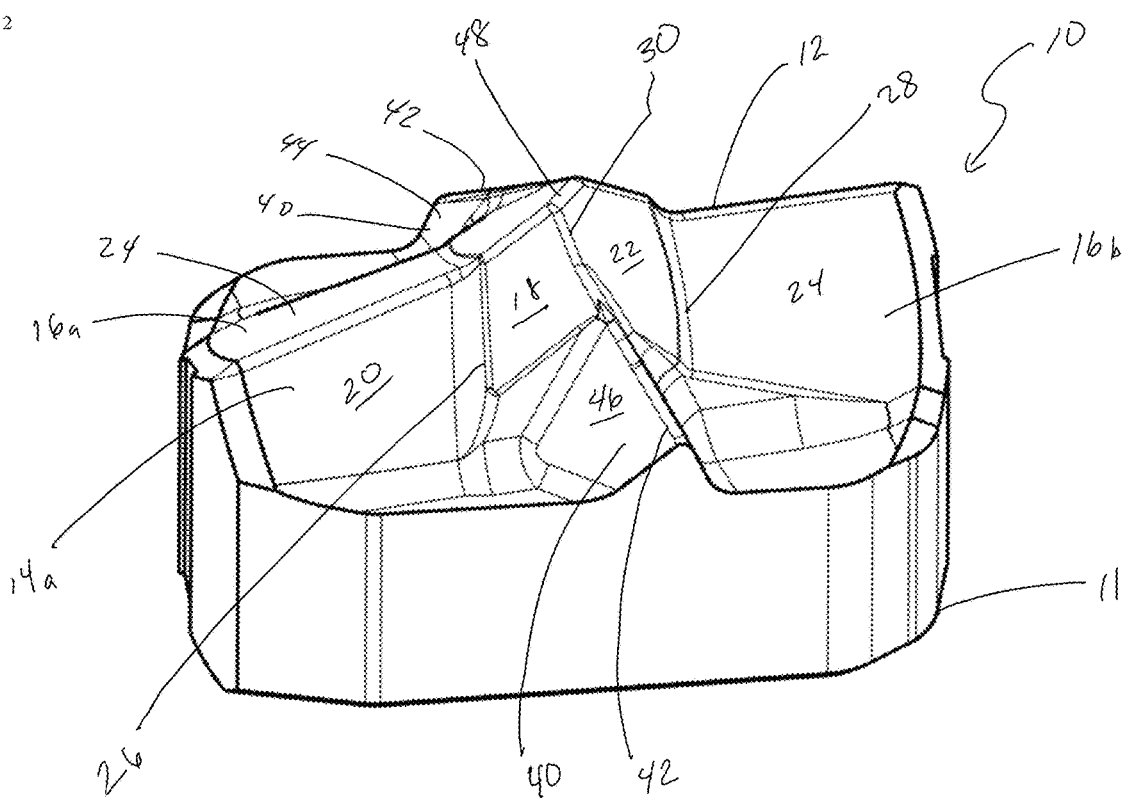
FIG. 2 is a perspective view of a cutting head of a first embodiment of a one piece cutting head for the drill bit of FIG. 1.
Figure 3:
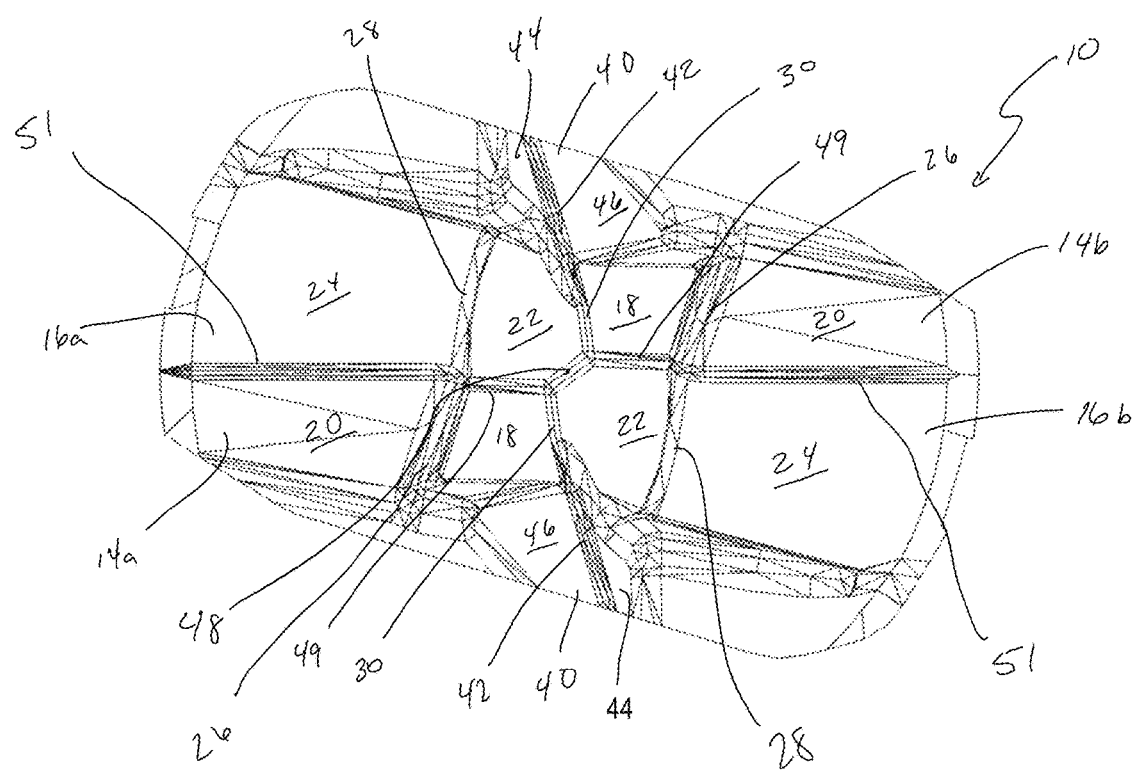
FIG. 3 is a top plan view of FIG. 2.
Figure 4:
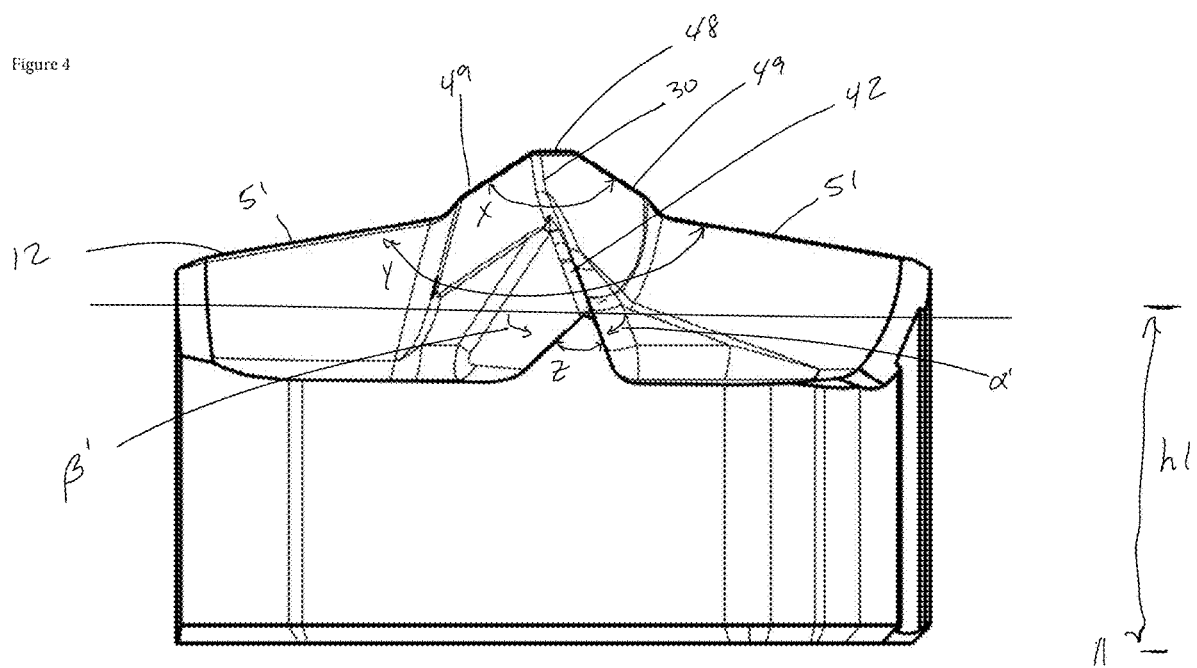
FIG. 4 is a side elevation FIG. 2.
Figure 5:
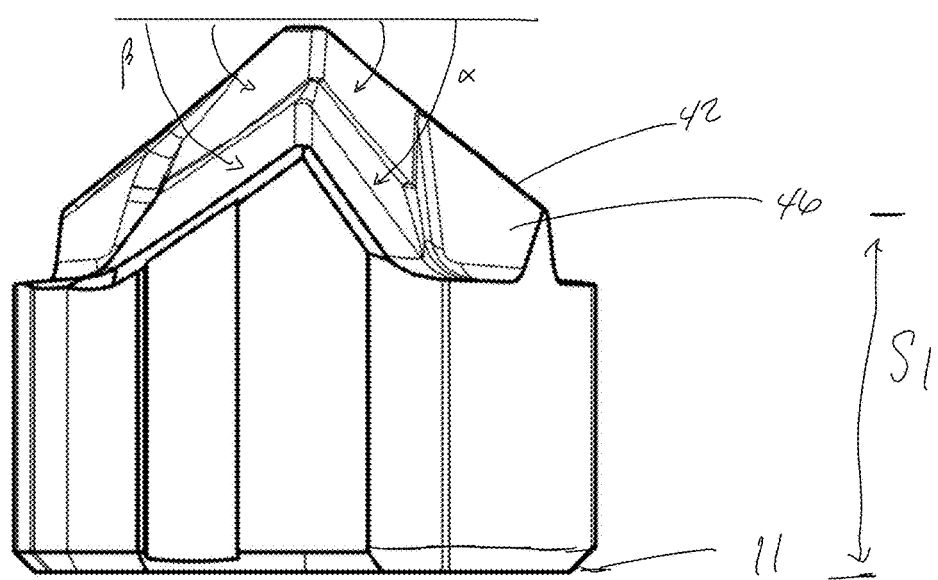
FIG. 5 is a side elevation of FIG. 2 rotated 90°.
Figure 6:
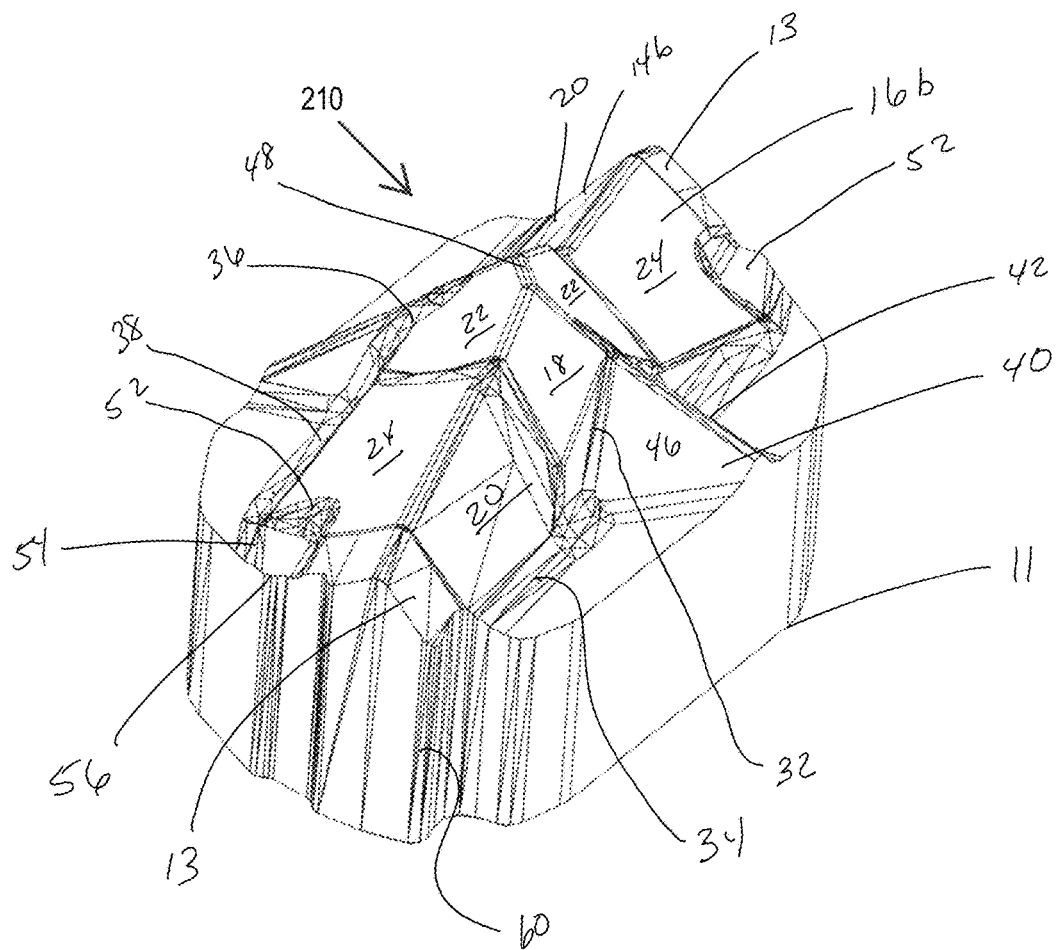
FIG. 6 is a perspective view of a second embodiment of a one-piece cutting head for the drill bit of FIG. 1.
Figure 7:
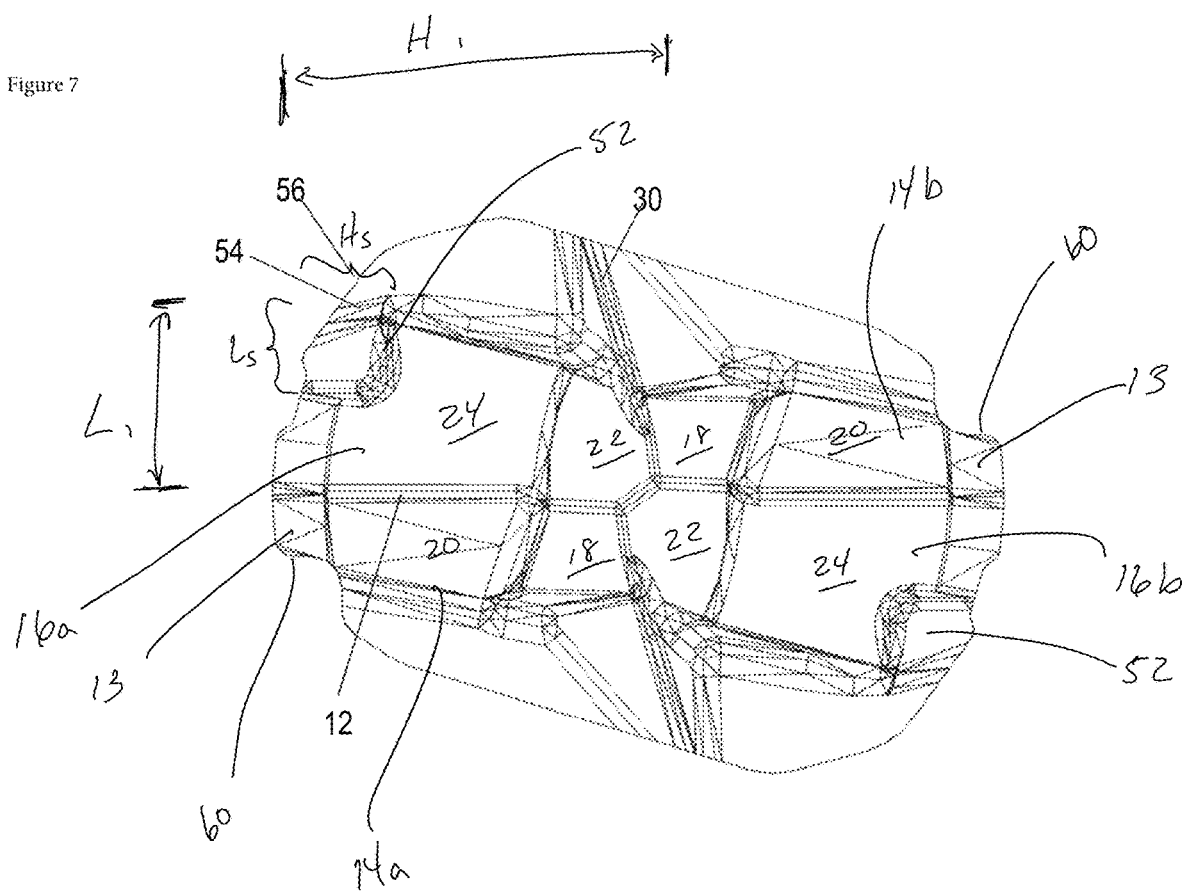
FIG. 7 is a top plan view of FIG. 6.
Figure 8:
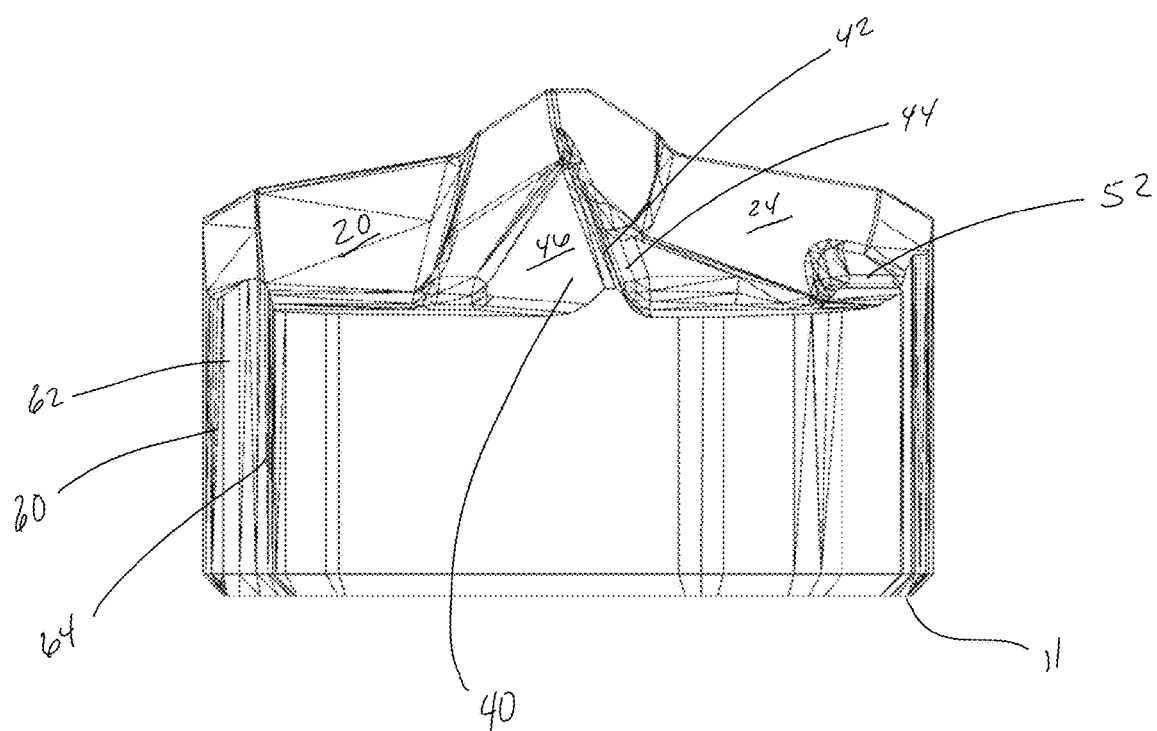
FIG. 8 is a side elevation of FIG. 6
Figure 9:
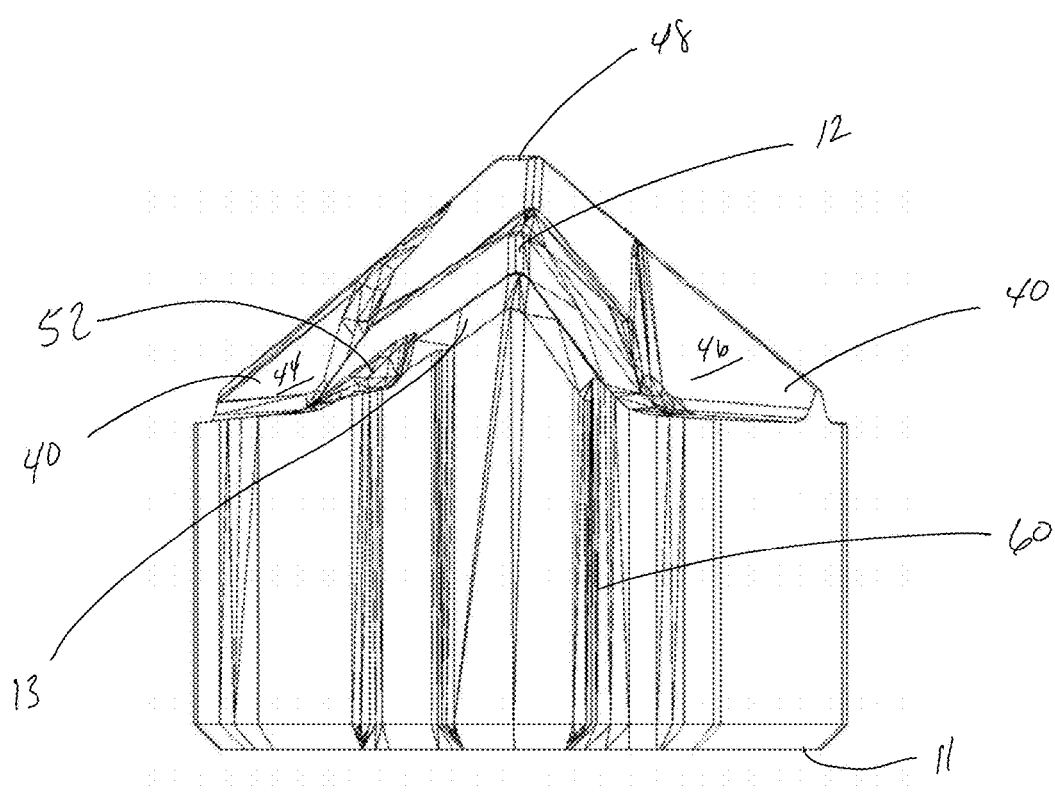
FIG. 9 is a side elevation of FIG. 6 rotated 90°.
Figure 10:
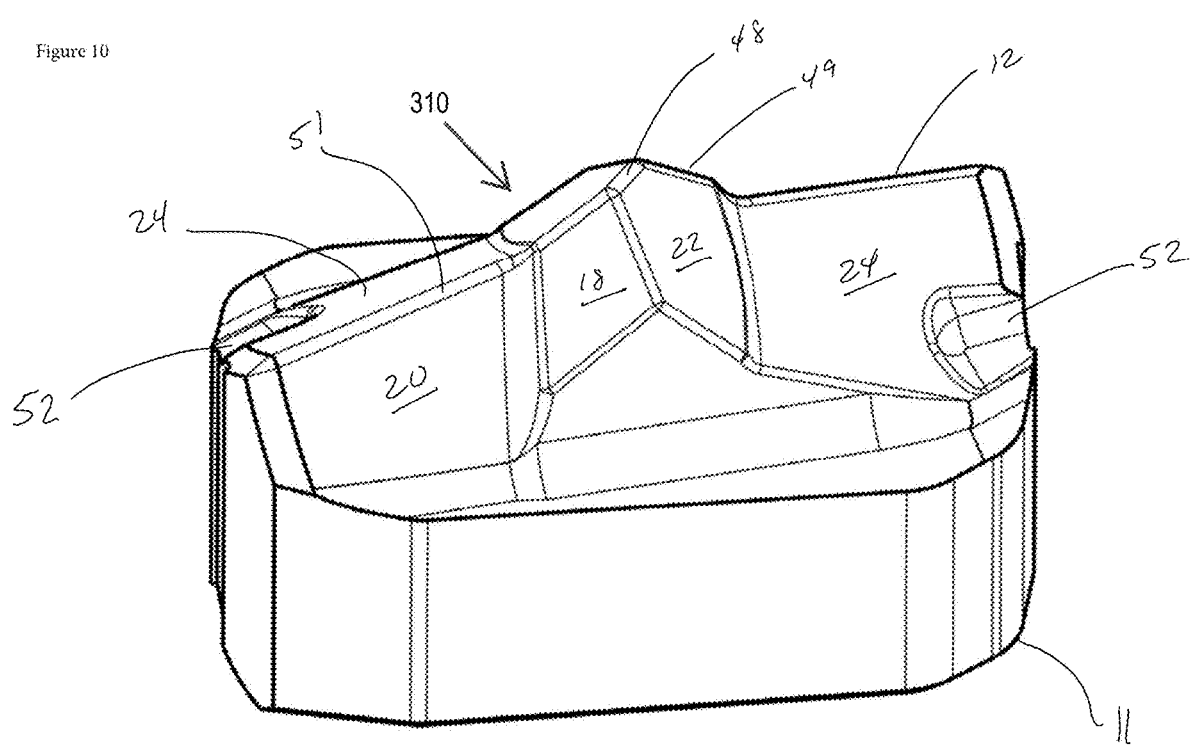
FIG. 10 is a perspective view of a third embodiment of a one-piece cutting head for the drill bit of FIG. 1.
Figure 11:
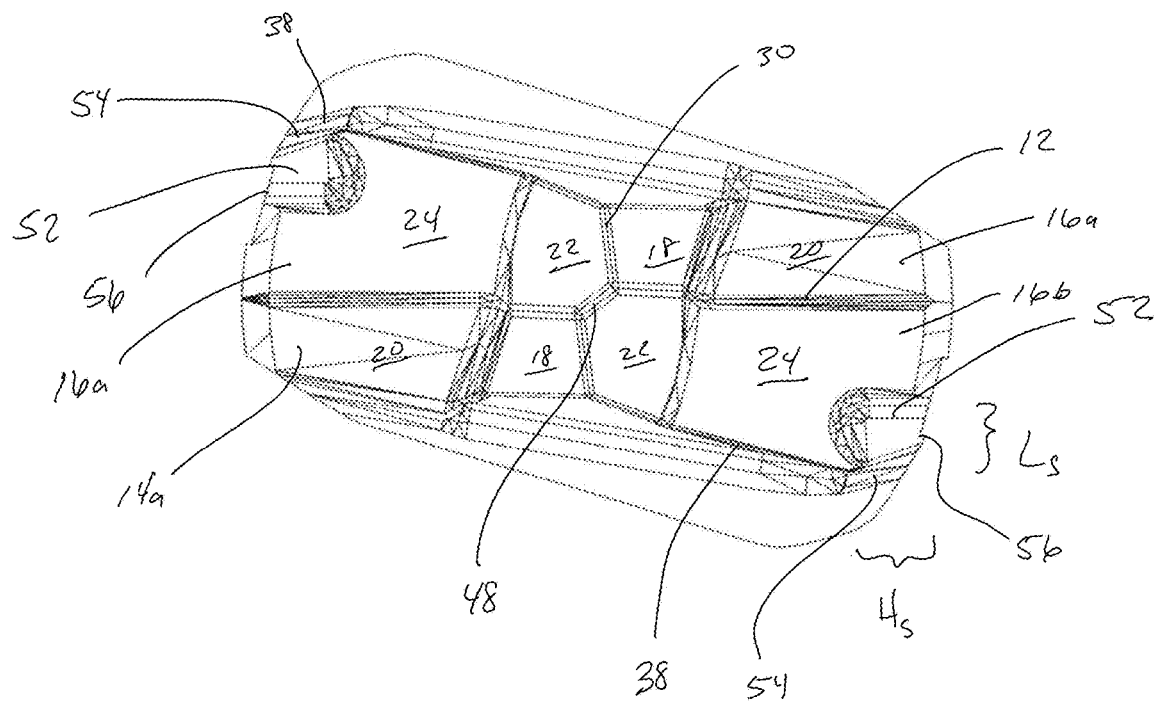
FIG. 11 is a top plan view of FIG. 10.
Figure 12:
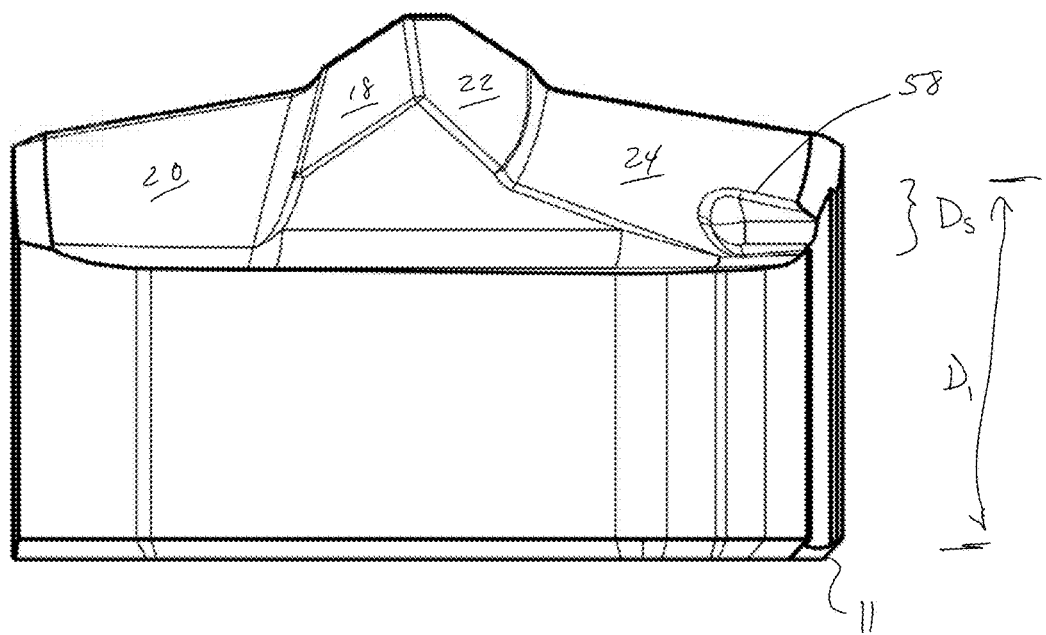
FIG. 12 is a side elevation of FIG. 10.
Figure 13:
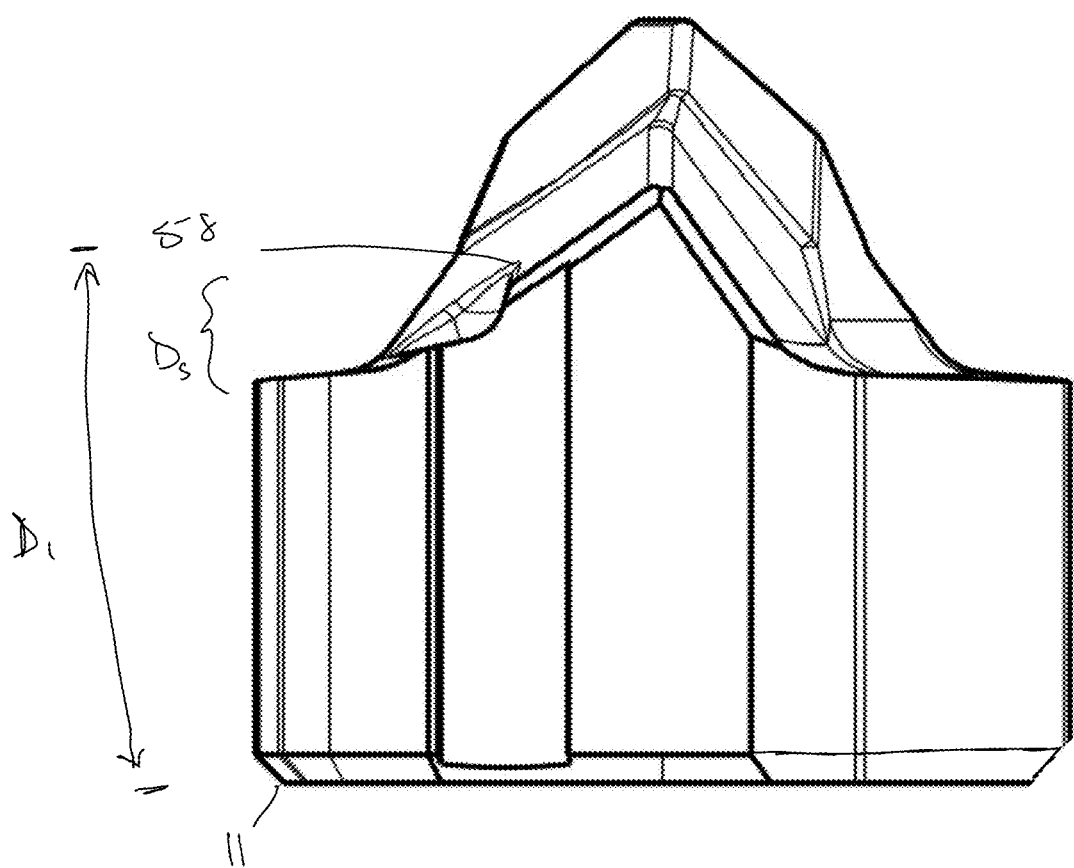
FIG. 13 is a side elevation of FIG. 10 rotated 90°.
Figure 14:
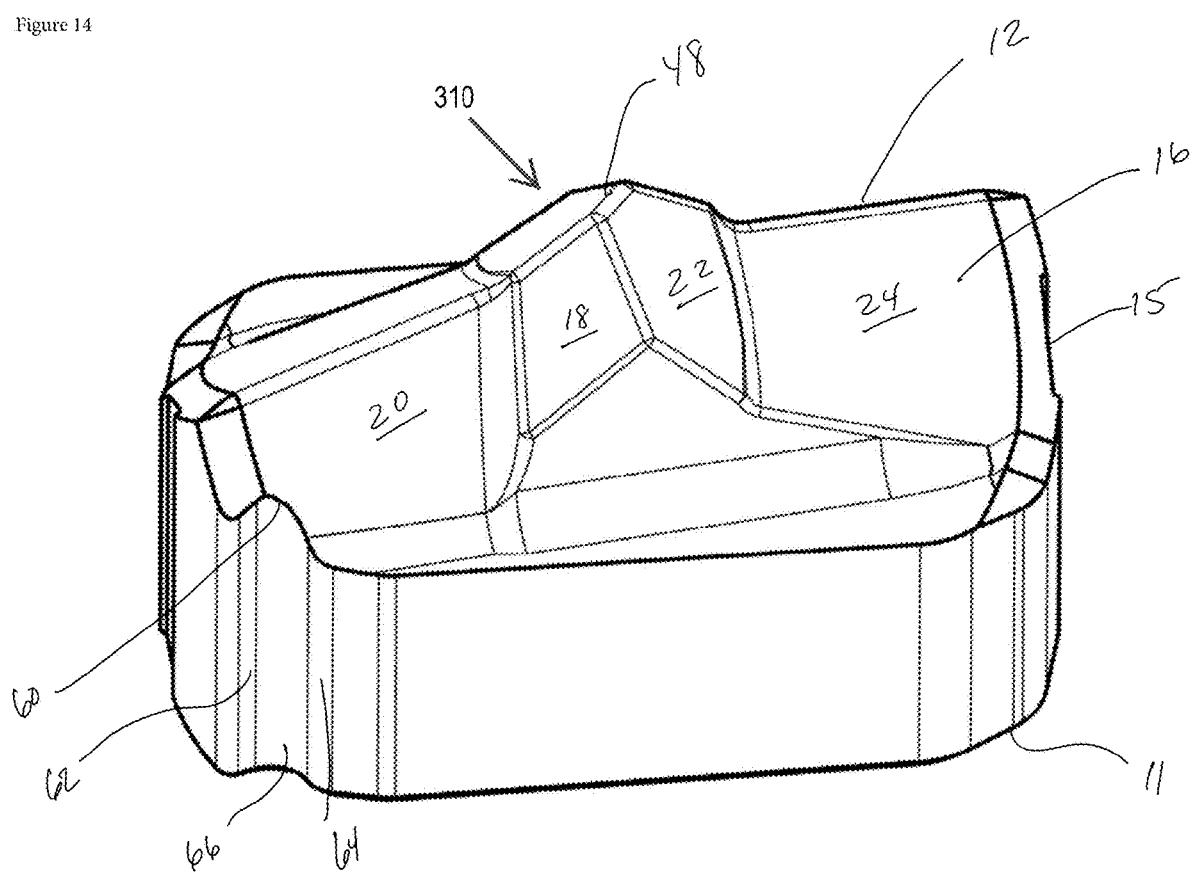
FIG. 14 is a perspective view of a second embodiment of a one-piece cutting head for the drill bit of FIG. 1.
Figure 15:
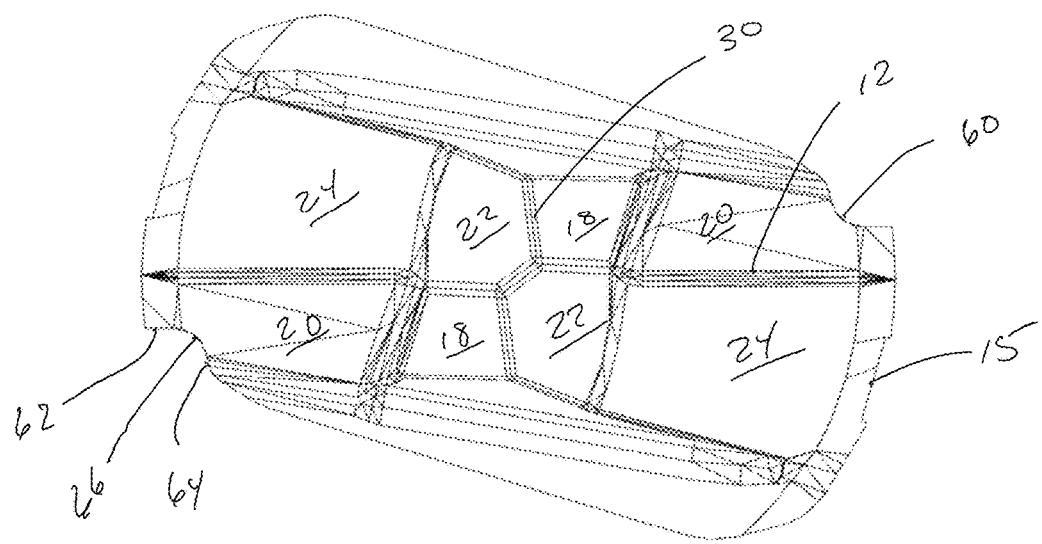
FIG. 15 is a top plan view of FIG. 14.
Figure 16:
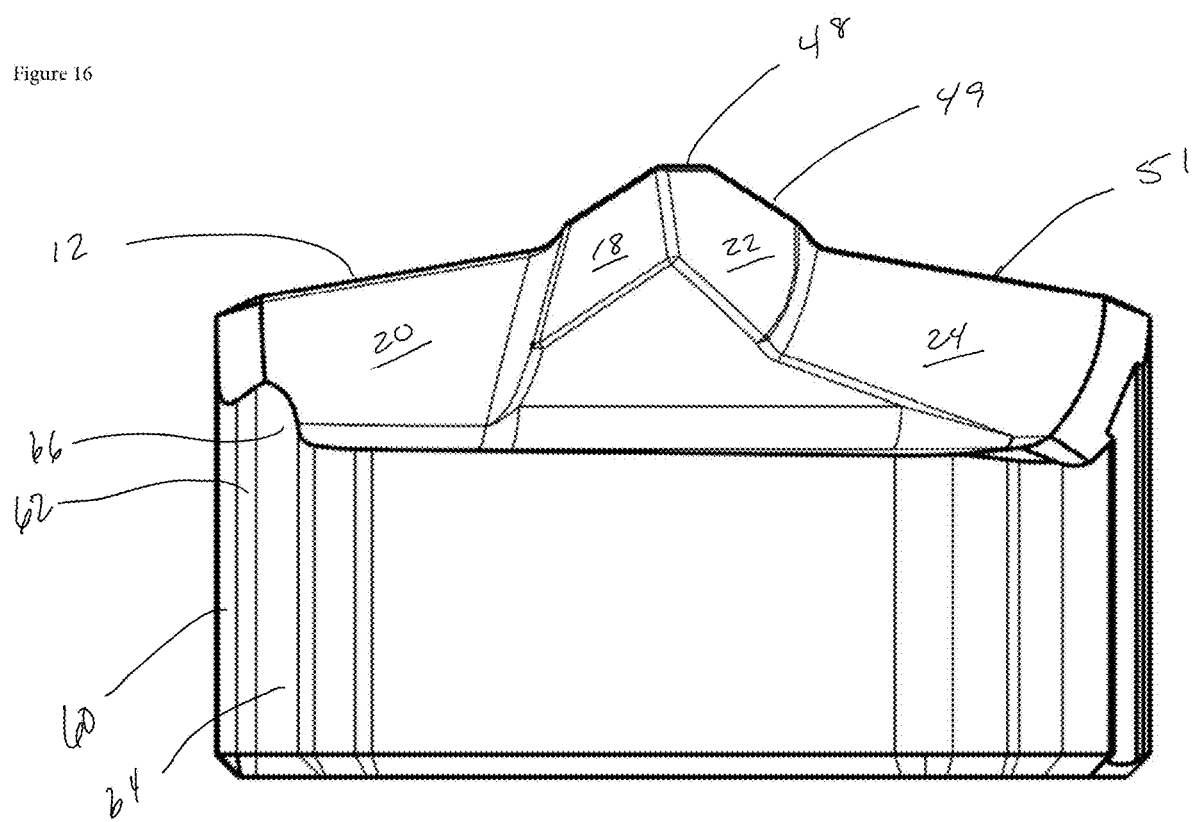
FIG. 16 is a side elevation of FIG. 14.
Figure 17:
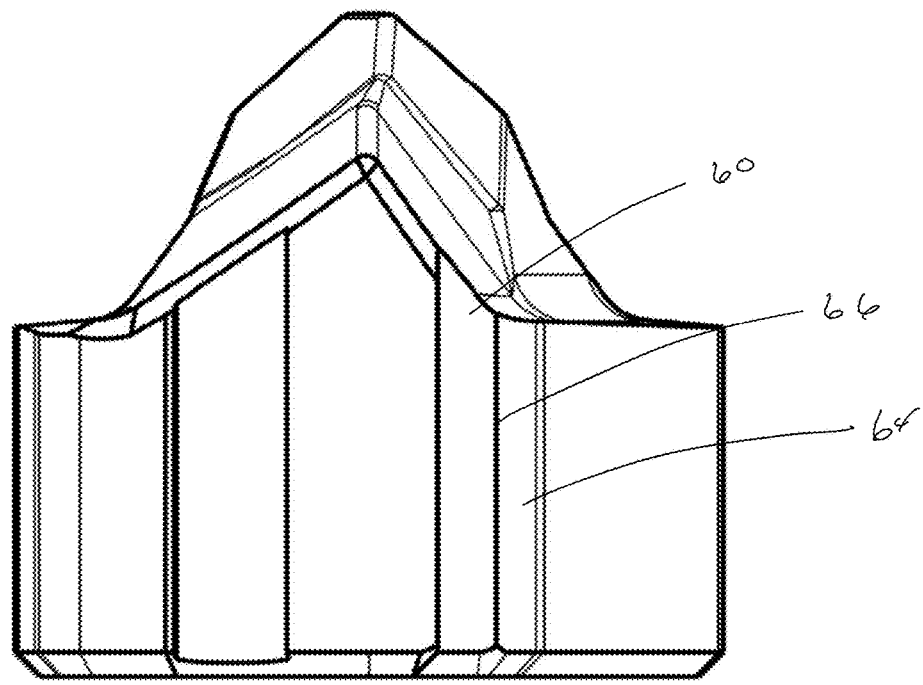
FIG. 17 is a side elevation of FIG. 14 rotated 90°.

In the figures, particularly FIG. 1, a drill bit is illustrated and designated with the reference numeral 2. The drill bit 2 includes a body 4 that includes a fluted portion 6 and a shank portion 8. The shank portion 8 is generally a SDS, SDS Plus or SDS Max type. A one piece formed cutting head 10 is secured to the end of the flute portion 6. The cutting head 10 has a substantially rectangular cross section. It includes a base 11 that is configured to be welded or otherwise secured to the flute portion 6.

Turning to FIGS. 2-6, a first embodiment of the cutting head 10 is illustrated. The one-piece cutting head 10 includes a main cutting edge 12 that extends substantially between radial extremities of the cutting head 10. In some embodiments, the main cutting edge 12 may be chamfered 13 at its radial extremities. The main cutting edge 12 is an edge between main rake surfaces 14a, 14b and main relief surfaces 16a, 16b of the cutting head 10. Each main rake surface 14 comprises one or more rake facets 18, 20. Likewise, each main relief surface comprises one or more relief facets 22, 24. Each rake facet 18, 20, and relief facet 22, 24, also include an outer edge 32, 34, 36, 38. Said outer edges are all spaced apart from the main cutting edge 12.

The main cutting edge 12 may include a chisel edge 48, a first cutting edge 49 and a second cutting edge 51. In embodiments were each main rake surface 14 comprises two or more rake facets, the first rake facet 18 is positioned adjacent the chisel edge 48. The first facet 18 is a planar surface and extends from the first cutting portion 49 of the main cutting edge 12. The second rake facet 20 is adjacent the first rake facet 18. The second rake facet 20 is a planar surfaces and extends from the second cutting portion 51. The rake facets 18, 20 have a transverse edge 26 therebetween. The transverse edge 26 extends away from the main cutting edge 12 without meeting another transverse edge.

The two rake facets 18, 20 are both forward facing in terms of the direction of rotation of the drill bit, in use. The two forward facing rake facets 18, 20 define a rake angle that varies along the main cutting edge 12 from the axis of the drill bit 2 to the radial extremity of the cutting head. The rake angle α is the angle between the line drawn perpendicular to the axis of the drill bit and the forward facing surface of the cutting head 10 when viewed from the side as ins FIG. 5. It is designated with the reference a. The rake facets 18, 20 each have a rake angle of 45° to 55°.

The rake surfaces 14a and 14b are identical and, thus the foregoing explanation relating to first and second rake facets 18, 20 apply equally thereto.

The main relief surfaces 16a, 16b are identical and may include one or more relief facets. In the embodiment shown, the main relief surfaces 16a, 16b include a first relief facet 22 and a second relief facet 24. The first relief facet 22 is a planar surface and is adjacent both the first rake facet 18 and the second relief facet 24. The first relief facet 22 also extends from the first cutting portion 49 of the main cutting edge 12 in a direction opposite from the first rake facet 18. A transverse edge 28 is formed at the interface between the first relief facet 22 and the second relief facet 24. A primary transverse edge 30 is formed at the interface between the first rake facet 18 and the first relief facet 22. Both the transverse edge 28 and the primary transverse edge 30 extend away from the main cutting edge 12 without meeting another transverse edge. The second relief facet 24 is also a planar surface and extends from the second cutting portion 51 in a direction opposite from the second rake facet 20.

The two relief facets 22, 24 are both backward facing in terms of the direction of rotation of the drill bit, in use. The two backward facing relief facets 22, 24 define a relief angle β of 35° to 40° The first relief facet 22 has a relief angle β that varies along the main cutting edge 12 from the axis of the drill bit 2 to the radial extremity of the cutting head 10. The relief angle β is the angle between the line drawn perpendicular to the axis of the drill bit and the backward facing surface of the cutting head 10 when viewed from the side as in FIG. 5. It is designated with β. The relief facets 22, 24 each have a relief angle of 35° to 40°.

The relief surfaces 16a and 16b are identical and, thus the foregoing explanation relating to first and second relief facets 22, 24 apply equally thereto.

The central chisel edge 48 is perpendicular to the axis of the drill bit 2. Extending radially outward from the axis, the point angle varies stepwise to produce an approximate roof shape. Thus, the point angle (X) between the first cutting edge portions 49 is 155° to 165°. The angle (Y) decreases to 155° to 165° along the second cutting edge portion 51.

In one preferred embodiment, the one-piece cutting head 10 includes a plurality of side cutters 40. These side cutters 40 are substantially perpendicular to the main cutting edge 12. The side cutters 40 propagate from a primary transverse edge 30 and extend to a radial extremity of the cutting head 10 that is different than the radial extremity of the main cutting edge 12. Each side cutter includes a cutting edge 42 that is an edge between a side cutting rake facet 44 and a side cutting relief facet 46.

The side cutting rake facet 44 is forward facing in terms of the direction of the rotation of the drill bit, in use. The forward facing side cutting rake facet 44 defines a side cutting rake angle α'. The side cutting rake angle a' is the angle between the line drawn perpendicular to the axis of the drill bit and to the forward facing surface of the side cutter 40 when viewed from the side as in FIG. 4. It is designated with α'. The side rake facet 44 has a rake angle of 50° to 60°.

The side cutting relief facet 46 is backward facing in terms of the direction of rotation of the drill bit in use. The backward facing side cutting relief facet 46 defines a died cutting relief angle β'. The side cutting relief angle β' is the angle between the line drawn perpendicular to the axis of the drill bit and to the backward facing surface of the side cutter 40 when viewed from the side as in FIG. 4. It is designated with β'. The side rake facet 46 has a rake angle of 60° to 70°.

The side cutting edge 42 is substantially perpendicular to the axis of the drill bit. The point angle (Z) of the side cutting edge 42 may vary from about 45° to 55°. The height (S1) of the side cutter 40 as measured from a base 11 of the cutting head 10 to the cutting edge 42 may vary from between 0% and 30%. In other words, a first point of the side cutting edge 42 may be the same height or as much as 30% higher or shorter than any other point on side cutting edge 42.

Turning now to FIGS. 6-17, other embodiments of the cutting heads 210, 310, 410 are shown. FIGS. 6-9 show a second embodiment of a cutting head 210 that includes all of the features of the first embodiment of the cutting head 10 shown in FIGS. 1-5, as well as two additional features, namely pockets 52 on the main relief surfaces 16a, 16b and a friction reducing cutting edges 60. FIGS. 10-13 show a third embodiment of a cutting head 310 that includes all of features of the first embodiment of the cutting head 10 shown in FIGS. 1-5, as well as the pockets 52 shown in the second embodiment of the cutting head 210 shown in FIGS. 6-9, but not the friction reducing cutting edges 60. FIGS. 14-17 show a fourth embodiment of a cutting head 310 that includes all of features of the first embodiment of the cutting head 10 shown in FIGS. 1-5, as well as the friction reducing cutting edges 60 shown in the second embodiment of FIGS. 6-9, but not the pockets 52.

As is shown in the second embodiment of FIGS. 6-9 and the third embodiment of FIGS. 10-13, the cutting heads 210, 310 each include pockets 52 are positioned on a main relief surface 16a, 16b. Specifically, said pockets 52 may be positioned on relief facet 24 at a radial extremity of the cutting head 10. As such, pockets 52 include a radial edge 56 that coincides with a radial extremity of the cutting head 10. Further, pockets 52 are preferably spaced away from the main cutting edge 12 and adjacent the outer edge 38 of relief facet 24. Pocket 52 includes a distal edge 54 that coincides with outer edge 38. Pocket 52 may further be defined by a longitudinal span (Ls) that is about 45% to 50% of the distance L1 as measured from the main cutting edge 12 to the distal edge 54. Pockets 52 also include a horizontal span (Hs) that is about 23% to 27% of the distance H1 measured from the primary transverse edge 30 to the radial edge 56. Pockets further include a top edge 58 that coincides with the planar surface of facet 24. Pockets 52 have a depth span (Ds) that is about 5% to 15% of the distance D1 as measured from the base 11 of the cutting head 10 to the top edge 58 of the pocket 52 (see FIG. 12). The present invention contemplates the use of pockets 52 being employed as a stand-alone feature as disclosed in FIGS. 10-13 or in combination with other features as disclosed in FIGS. 6-9.

In in the second embodiment of FIGS. 6-9 and the fourth embodiment of FIGS. 14-17, the cutting heads 210, 410 each include a pair of friction reducing friction reducing cutting edges 60. Friction reducing cutting edges 60 (also called circular cutting edges) run from the base 11 of the cutting head 10 to the planar surface of the main rake surfaces 14a, 14b. Friction reducing cutting edges 60 are forward facing in of the direction of rotation of the drill bit in use. Friction reducing cutting edges 60 are carveouts that are positioned on what can be characterized as the corners of the substantially rectangular base 11. As such, they include at least two sheer faces 62, 64. The sheer faces 62, 64 may form an approximately 90° square angle with one another. In an embodiment, a rounded corner 66 connects sheer faces 62, 64. The first sheer face 62 is substantially parallel with the main cutting edge 12. The second sheer face 64 is substantially perpendicular to the main cutting edge 12. The cutting heads 10 having one or more friction reducing cutting edge 60 have an advantage over cutting heads without said circular cutting heads in that friction is substantially reduced during the operation of the drill. Increased friction may lead to seizing and ultimately breaking drill bits. For example, when drilling into concrete including rebar, it is known that cutting heads can often get so hot as to cause the cutting head to weld to the rebar. This drastically slows down the drilling process and may cause the drill bit to seize and break. By reducing the friction associated with the drilling process, friction reducing cutting edges 60 substantially reduce the frequency of these adverse effects. As with the previously disclosed features of the side cutter 40 and pocket 52, the friction reducing cutting edge 60 may be used as a stand-alone feature as shown in FIGS. 14-17 or in combination with other features as shown in FIGS. 6-9.

It should be understood that although the invention has been described in conjunction with specific embodiments thereof, it is evident that many alternatives, modifications, and variations will be apparent to those skilled in the art. For example, any of the foregoing embodiments may employ other known technologies such as wear indicators. Accordingly, it is intended to embrace all such alternatives, modifications and variations that fall within the scope of the claims.

What is claimed is:

1. A one-piece cutting head for a drill bit, comprising:
    first and second main cutting edges extending from a central portion of the cutting head to first and second radial extremities of the cutting head, the first main cutting edge being disposed between a first main rake surface and a first main relief surface, and the second main cutting edge being disposed between a second main rake surface and a second main relief surface, wherein each main rake surface includes one or more rake facets and each main relief surface includes one or more relief facets, and wherein the first main rake surface and the second main relief surface define a first primary transverse edge therebetween and the second main rake surface and the first main relief surface define a second primary transverse edge therebetween, each primary transverse edge extending away from the main cutting edges in a transverse direction from the main cutting edges,
    first and second side cutters that are transverse to the main cutting edges, the first and second side cutters propagating from the first and second primary transverse edges and extending to third and fourth radial extremities of the cutting head that are different from the first and second radial extremities, and wherein each side cutter includes a side cutting edge between a side cutting rake facet and a side cutting relief facet; and
    first and second pockets defined in the first and second main relief surfaces, the first and second pockets each having a longitudinal span in a direction transverse to the first and second main cutting edges and a horizontal span in a direction parallel to the first and second main cutting edges, each horizontal span having a horizontal length that is less than a length of each main cutting edge.

2. The cutting head according to claim 1, wherein the one or more rake facets comprises two or more rake facets.

3. The cutting head according to claim 1, wherein the one or more relief facets comprise two or more relief facets.

4. The cutting head according to claim 1, in which the first and second main cutting edges each include a first cutting edge portion defining a first point angle therebetween and a second cutting edge portion defining a second point angle therebetween, the second point angle being greater than the first point angle.

5. The cutting head according to claim 4, wherein the first point angle is between 115° and 125°.

6. The cutting head according to claim 5, wherein the second point angle is between 145° and 155°.

7. The cutting head according to claim 1, wherein the main cutting edge has a rake angle of between 85° and 95°.

8. The cutting head according to claim 1, wherein the side cutting edge has a cutting angle of between 45° and 55°.

9. The cutting head according to claim 1, wherein each point on the side cutting edge has a height measured from a base of the cutting head that is no greater than 30% higher and no less than 30% shorter than a height all other points on side cutting edge.

10. The cutting head according to claim 1, wherein the first and second pockets are positioned at the first and second radial extremities of the cutting head.

11. The cutting head according to claim 1, wherein the first and second pockets are spaced from the first and second main cutting edges in a direction transverse to the first and second main cutting edges.

12. The cutting head according to claim 1, wherein the longitudinal span of the first and second pockets are each about 45% to 50% of a distance measured from the first and second main cutting edges to distal edges of the first and second pockets.

13. The cutting head according to claim 1, wherein the horizontal span of each pocket is about 23% to 27% of a distance measured from the primary transverse edge to a radial edge of each pocket.

14. The cutting head according to claim 1, wherein each pocket has a depth that is about 5% to 15% a distance measured from a base of the cutting head to a top edge of each pocket.

15. The cutting head according to claim 1, further comprising first and second friction reducing cutting edges that run from a base of the cutting head to the first and second main rake surfaces and that are forward facing in of a direction of rotation of the cutting head.

16. The cutting head of claim 15, wherein the friction reducing cutting edges are formed as carveouts in corners of the base.

17. The cutting head of claim 16, wherein each friction reducing cutting edge includes two approximately perpendicular sheer faces and a rounded corner connecting the sheer faces.

18. A one-piece cutting head for a drill bit, comprising:
    first and second main cutting edges extending from a central portion of the cutting head to first and second radial extremities of the cutting head, the first main cutting edge being disposed between a first main rake surface and a first main relief surface, and the second main cutting edge being disposed between a second main rake surface and a second main relief surface, wherein each main rake surface includes one or more rake facets and each main relief surface includes one or more relief facets, and wherein the first main rake surface and the second main relief surface define a first primary transverse edge therebetween and the second main rake surface and the first main relief surface define a second primary transverse edge therebetween, each primary transverse edge extending away from the main cutting edges in a transverse direction from the main cutting edges,
    first and second side cutters that are transverse to the main cutting edges, the first and second side cutters propagating from the first and second primary transverse edges and extending to third and fourth radial extremities of the cutting head that are different from the first and second radial extremities, and wherein each side cutter includes a side cutting edge between a side cutting rake facet and a side cutting relief facet; and first and second of friction reducing cutting edges that run from a base of the cutting head to the first and second main rake surfaces and that are forward facing in of a direction of rotation of the cutting head, wherein the friction reducing cutting edges are formed as carveouts in corners of the base.

19. The cutting head according to claim 18, wherein the one or more rake facets comprises two or more rake facets.

20. The cutting head according to claim 18, wherein the one or more relief facets comprise two or more relief facets.

21. The cutting head according to claim 18, wherein the first and second main cutting edges each include a first cutting edge portion defining a first point angle therebetween and a second cutting edge portion defining a second point angle therebetween, the second point angle being greater than the first point angle.

22. The cutting head according to claim 18, wherein each point on the side cutting edge has a height measured from the base that is no greater than 30% higher and no less than 30% shorter than a height all other points on side cutting edge.

23. The cutting head according to claim 18, wherein each friction reducing cutting edge includes two approximately perpendicular sheer faces and a rounded corner connecting the sheer faces.

24. A drill bit comprising:
a shank portion;
a flute portion having a first end coupled to the shank portion; and
a one piece cutting head coupled to a second end of the flute portion, the one piece cutting head including
first and second main cutting edges extending from a central portion of the cutting head to first and second radial extremities of the cutting head, the first main cutting edge being disposed between a first main rake surface and a first main relief surface, and the second main cutting edge being disposed between a second main rake surface and a second main relief surface, wherein each main rake surface includes one or more rake facets and each main relief surface includes one or more relief facets, and wherein the first main rake surface and the second main relief surface define a first primary transverse edge therebetween and the second main rake surface and the first main relief surface define a second primary transverse edge therebetween, each primary transverse edge extending away from the main cutting edges in a transverse direction from the main cutting edges, first and second side cutters that are transverse to the main cutting edges, the first and second side cutters propagating from the first and second primary transverse edges and extending to third and fourth radial extremities of the cutting head that are different from the first and second radial extremities, and wherein each side cutter includes a side cutting edge between a side cutting rake facet and a side cutting relief facet; and first and second pockets defined in the first and second main relief surfaces, the first and second pockets each having a longitudinal span in a direction transverse to the first and second main cutting edges and a horizontal span in a direction parallel to the first and second main cutting edges, each horizontal span having a horizontal length that is less than a length of each main cutting edge.

25. The cutting head according to claim 24, wherein the cutting head further comprises first and second friction reducing cutting edges that run from a base of the cutting head to the first and second main rake surfaces and that are forward facing in of a direction of rotation of the cutting head.

* * * * *